INVENTOR.
GASTON SALMET
BY
Frank R. Trifari
AGENT

INVENTOR.
GASTON SALMET
BY
Frank R. Trifari
AGENT

INVENTOR.
GASTON SALMET
BY
Frank R. [signature]
AGENT

United States Patent Office 3,440,353

Patented Apr. 22, 1969

3,440,353
RADIO-TRANSMISSION SYSTEM

Gaston Salmet, St. Maur, France, assignor, by mesne assignments, to U.S. Philips Corporation, New York, N.Y., a corporation of Delaware Filed June 18, 1965, Ser. No. 465,025
Claims priority, application France, June 26, 1964, 979,700
Int. Cl. H04j 1/04; H04b 7/00; H03k 7/04
U.S. Cl. 179—15 11 Claims

ABSTRACT OF THE DISCLOSURE

A pulse code modulation transmission system in which intelligence is transmitted in the form of pulse position modulation. The pulses are also coded to form a continuously transmitted address, by providing predetermined delays between the pulses of pulse sequences. The receiver includes coding means to inhibit the reception of pulse sequences that do not have the correct predetermined delays in the pulses.

The invention relates to a radio-transmission system between a number of stations, the communication between the various stations being established by pulse modulation, particularly pulse position modulation of pulses which are located for the various stations approximately in the same frequency band, while during a communication between two stations an address characteristic of the station concerned is transmitted simultaneously and continuously with the transmitted pulses by an address transmitter, which address locks the communication between said two stations.

Such systems for radio transmission are known in literature under the name of "radas"; such a system is described for example in the review I.R.E. "Transaction on vehicular communications," August 1961, pages 40–44.

A further embodiment of such a radio-transmission system has been proposed in prior French patent specification 1,363,295 of the applicant, in which the receiver is provided with an automatic frequency control device, which releases the receiver for a short time and with a desynchronising device controlled by the incoming pulses for interrupting the A.F.C. device, when the incoming pulses do not correspond to a given characteristic combination of pulses. If the incoming pulses correspond to the relevant characteristic combination, the desynchronising device is put out of operation, so that the receiver is locked at the incoming pulses.

It is advantageous to use pulse position modulation in the radio-transmission system according to the invention. In the French Patent 1,383,919 it has been explained that such a modulation is particularly effective for suppressing disturbances.

The invention has for its object to provide a radio-transmission system of the type set forth, which provides apart from the known advantages a number of additional advantages, i.e.:

Simplicity of apparatus, particularly since only one high-frequency channel is required;

A very great number of addresses for possible communications without excessive complications;

A rapid establishment of the communication (less than half a second in practice);

Substantially complete secrecy (third persons can substantially not monitor the call if they do not know the address due to the great number of communications);

A particularly attractive distribution, avoiding long disturbances.

According to the invention, in the local address transmitter at the transmitter end the pulses to be transmitted are separated in a pulse distributor into pulse groups lying in successive time intervals. The address transmitter comprises a delay device coupled with the distributor for producing a characteristic delay between successive pulses of one group. The receiver comprises an address receiver which establishes the communication only at the appearance of pulse groups with characteristic time delays between the successive pulses.

In a particularly advantageous embodiment the pulse distributor is formed by a number of gates which are released in order of succession for the selection of the successive pulses of one group while the delay device is connected in series with this pulse distributor. The delay device is formed by a number of adjustable delay networks, the periods of delay of which can be adjusted by a unity value of multiple thereof. The unity value of the time delay $t$ and hence also the multiples thereof exceed the duration T required for releasing the receiver, so that the relevant pulse can be received only when the release of the receiver exhibits an identical delay.

In order to form a given address the adjustment of the characteristic delay periods between the pulses of one group can be combined with the adjustment of the frequency of the pulses to be transmitted, which can be achieved in a simple manner by providing the transmitter device with an adjustable oscillator, which determines the frequency of the pulses to be transmitted and which supplies, in addition, the releasing pulses for the gates of the pulse divider.

In this manner a great number of addresses can be formed. If for example groups of four successive pulses are used, in which case the delay times between these pulses are 3 and if the frequency of the pulses is adjustable to ten frequency values, the total number of addresses is $10 \times 4^3 = 640$.

Without great difficulty for example 20 different pulse frequencies may be chosen, when groups of six pulses are employed, the number of address being thus $20 \times 6^5 = 155,520$. This illustrates clearly the importance of this system for obtaining a great number of communications in a simple manner.

The invention will now be described more fully with reference to the drawing.

Figure 1:
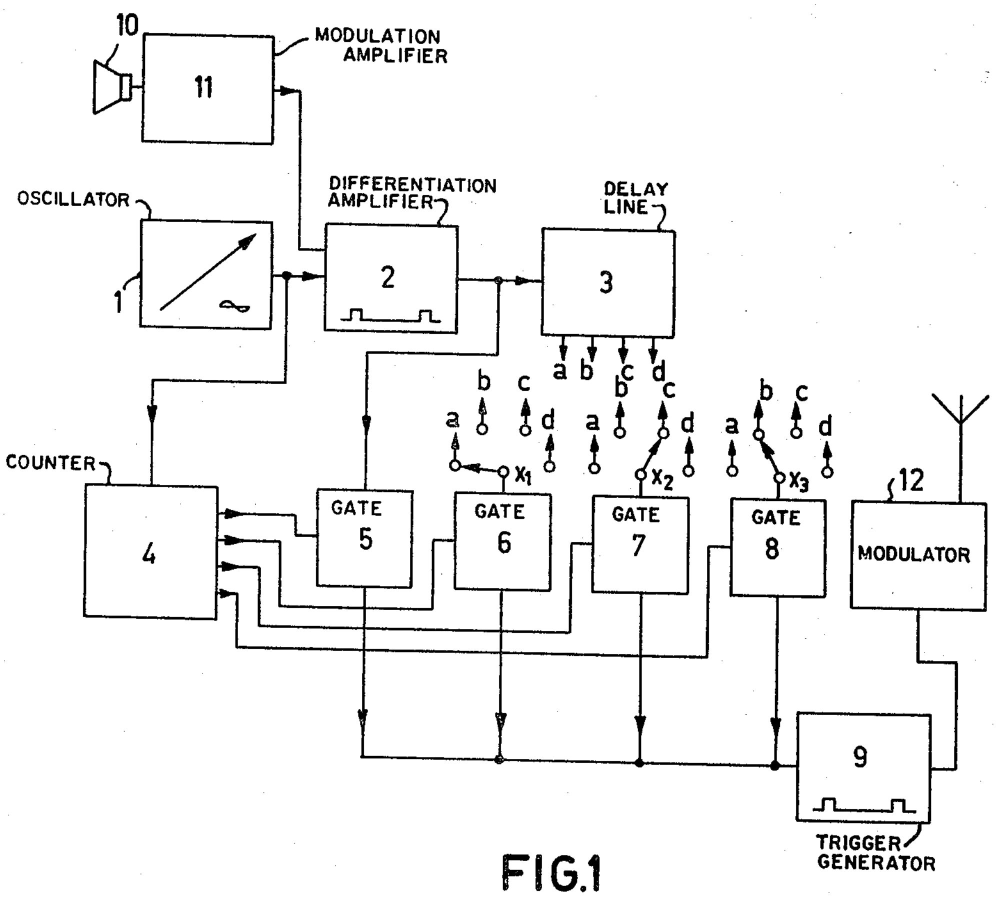
FIG. 1 shows a transmitter of a radio-transmission system according to the invention.

Referring to FIG. 1, reference numeral 1 designates a sine oscillator, the frequency of which can be adjusted to a satisfactorily stabilised value among ten different values, for example between 8 and 10 kc./s. The sinusoidal voltage produced is applied to a monostable generator or the like (for example a differentiation amplifier 2), which produces pulses of 2.5 µsec. with the repetition frequency of the oscillator 1.

To the generator 2 or to a stage connected herewith is fed the speech modulation voltage from the microphone 10 through a modulation amplifier 11. As a result of the modulation voltage from the modulation amplifier 11 the generator 2 produces in known manner position-modulated pulses, the instants of occurrence of which are shifted with respect to those of a modulation voltage zero by a value which is proportional to the instantaneous modulation voltage. The maximum time shift of the pulses with respect to the central position is limited to 0.8 µsec.

All pulses employed are transmitted in accordance with a "code" which forms one of the characteristics of the address for determining the communication between two stations.

The adjustable code is obtained by means of a system of gates which are controlled in the following manner.

The oscillator 1 controls a counter 4 having the ratio 1/4 (scale 4), which regulates the cyclic opening of the gates 5, 6, 7 and 8 in this order.

To the gate 5 are fed directly (or if desired through a pulse renewer) the pulses from the output of the generator 2; however, these pulses are fed, subsequent to their passage through the delay line 3, with time delay to the gates 6, 7 and 8, the delays being chosen in accordance with the gates. To this end the delay line is provided with various tappings, for example 4 (*a, b, c, d*) which provide delays of 3, 6, 9 and 12 μsec. respectively.

A switch X1, X2 or X3 is provided for each gate in order to connect each gate to one of the tappings *a, b, c* or *d*. In the drawing it is supposed that the points *a* are electrically interconnected; this also applies to each of the points *b, c, d*. Thus the delay for each gate can be selected, for the formation of a characteristic address from a group of four consecutive pulses, the first of which is not delayed, whereas the others exhibit characteristic delays. In the case described 64 different combinations are possible, each of which determines an address.

Since furthermore the frequency of the oscillator may be selected from ten different values, the total number of possible addresses is in the present case 640.

The outputs of the gates 5, 6, 7 and 8 are connected to each other and to the input of a trigger generator or reset stage 9, which reduces the duration of the pulses from 2.5 μsec. to 0.8 μsec. The generator 9 thus supplies pulse sequences coded in groups of four according to a given address. These pulses amplitude modulate a carrier in a modulator 12.

Figure 2:
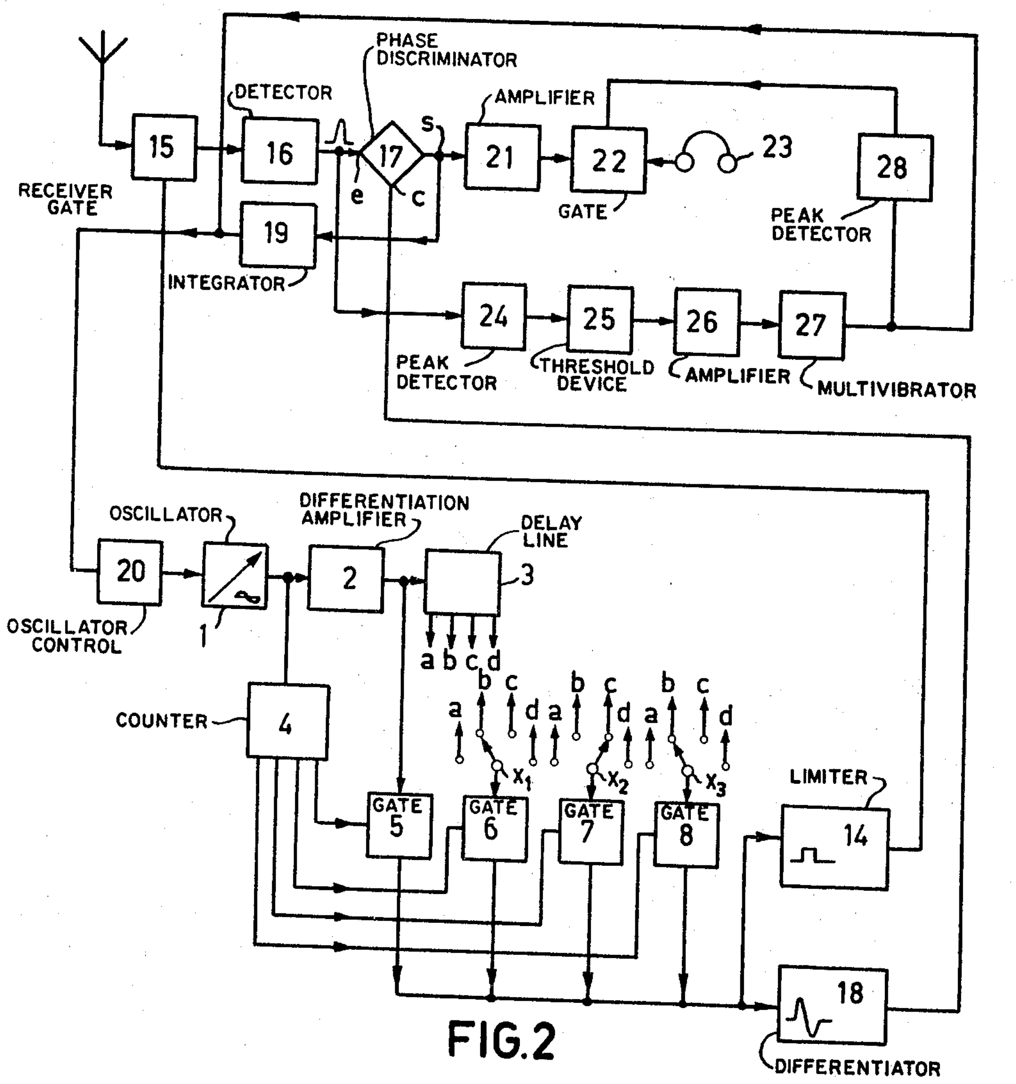
FIG. 2 shows a diagram of a receiver of a radio-transmission system according to the invention.

FIG. 2 shows the receiver co-operating with the transmitter of FIG. 1. Elements corresponding with those of FIG. 1 are designated by the same references.

Also the receiver shown in FIG. 2 comprises an oscillator 1, which can be tuned to ten different frequencies (with the same values as in the transmitter), a pulse generator 2 for producing pulses of 2.5 μsec., which generator is synchronised by the oscillator 1 (the generator is controlled in this case only by the oscillator voltage), a delay line with tappings *a, b, c, d,* the 4-counter 4 and the gate system 5, 6, 7 and 8, which are connected as in FIG. 1. The positions of the switches X1, X2 and X3 and the frequency of the oscillator 1 are identical to those of FIG. 1; if desired a communication corresponding to the same address or "code" as in the transmitter can be established.

It will furthermore be obvious that, since the same address transmitter is used in the transmitter and in the receiver, this device may form a commutatable unit of each combined transmitter-receiver station of the network in the case of duplex communication.

The common output of the gates 5 to 8 is connected to the input of a limiter 14, the output voltage of which controls a receiver gate 15, which is released in accordance with the address of the communication. Between the receiving aerial and the said gate 15 high-frequency stages may, of course, be connected.

After the gate 15 the pulses are fed to a detector 16, in which they are detected, after which they are applied to a phase discriminator 17 through the input *e*. For demodulation this phase discriminator 17 receives in addition reference pulses from the common output of the gates 5 to 8 after differentiation in a differentiation circuit 18.

The low-frequency voltage is derived from the output *s* of the discriminator 17. On the one hand the direct current component of the low-frequency voltage, subsequent to the passage through an integrating network 19, is applied to an adjusting member 20, which synchronises the oscillator 1 and the pulses derived therefrom in normal operation substantially with the incoming pulses (the integrating network 19 ensures that the oscillator 1 is synchronised with the medium value of the phase). In normal operation the locally produced address pulses, subsequent to differentiation in the differentiation circuit 18, convert the deflections of the incoming position-modulated pulses with respect to their reference instants in the phase discriminator into a voltage which is proportional to said deflection, so that the desired low-frequency signal is obtained at *s*.

The low-frequency signal obtained at *s*, subsequent to amplification in a low-frequency amplifier 21, is applied through a gate 22, to be described hereinafter, to the reproducing device 23.

In order to cause the address to fulfil its function it is necessary for the reception to be stopped when the code of the incoming pulses does not correspond or ceases to correspond to the address concerned.

For this purpose the pulses obtained at *e* are applied to a peak detector 24, with such a time constant that, when one or more address pulses are lacking the detected voltage drops to a value which is lower than that of a comparison voltage from a threshold device 25. In this case a pulse is produced by the threshold device 25 so that a multivibrator 27 is excited through an amplifier 26. This multivibrator produces an oscillatory voltage which is applied to the input of the adjusting member 20, so that the synchronisation of the oscillator 1 is disturbed. Reception is then no longer possible.

An additional device, operating in the same way, is formed by a peak detector 28, which detects the peaks of very proximate pulses from the multivibrator 27 with an adequately integrating time constant to supply a direct voltage which cuts off the gate 22 as long as the synchronisation is not restored, so that it is not possible to hear the demodulated signal which might be produced by undesirable noise signals.

The desynchronisation of the receiver is effectively obtained each time when the positions of the switches X1, X2 and X3 differ from each other, even if the frequencies of the oscillators are the same (if these frequencies are different, there is, of course, no synchronisation). In this case the gate 15 of the receiver is closed at the passage of at least one of the four pulses forming the address, since the unity of delay between the possible pulses (3 μsec.) is longer than the duration of opening of the gate (2.5 μsec.).

Figure 3:
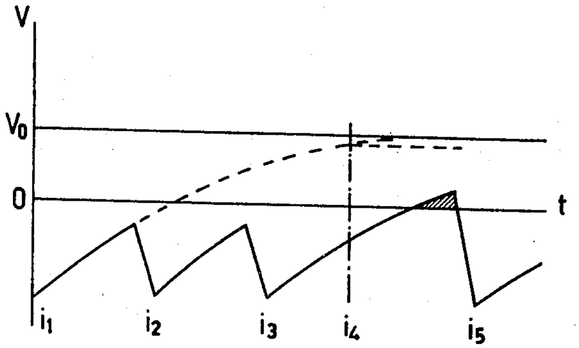
FIG. 3 shows a time diagram for explaining the operation of the receiver of FIG. 2
Figure 4:
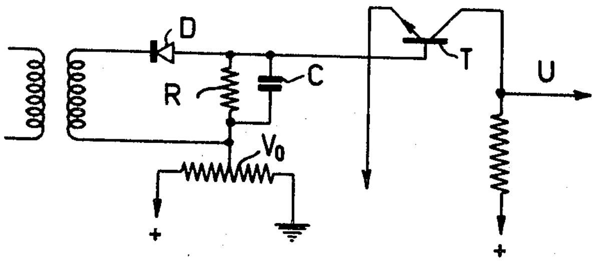
FIG. 4 shows a detail diagram of an element of the receiver.

FIG. 3 shows the principle of the peak detector 24 with the threshold device 25, it being assumed that a constant number of pulses (in this case four) has to be received; the diagram is shown by way of example in FIG. 4.

The diode detector D, together with an RC circuit, is biased by a positive voltage $V_0$, so that it can perform the desired peak detection. At $i_1$, $i_2$, $i_3$ the consecutive pulses are obtained, which are negatively detected by the diode D. If after the pulse $i_1$ no further pulses appear, the RC time constant would impart the course indicated by broken lines to the rising curve of the voltage. The next-following pulses $i_2$ reduces the voltage to that of $i_1$. If at $i_4$ a pulse is lacking, the capacitor C discharges further and the voltage passes through zero (shaded part). At this instant the voltage at the base of the transistor T becomes positive, so that a voltage pulse U is produced at the collector circuit of the transistor T, which voltage is applied to the multivibrator 27 through the amplifier 26.

The invention is not restricted to the example given above. Instead of position modulation of the pulses use may be made of a different modulation mode, for example amplitude modulation, if care is taken that the total number of address pulses remains constant.

What is claimed is:

1. In a pulse code communication system of the type in which a transmitter includes a source of information signals, a source of continuously occurring pulses, means for modulating said pulses with said information signals, a transmitting circuit for transmitting pulses, and means applying said modulated pulses to said transmitting circuit, and said system further includes a receiver for receiving said transmitted pulses, an output circuit, and means applying said received pulses to said output circuit; the improvement wherein said means for applying said modulated pulses to said transmitting circuit comprises delay means having a plurality of outputs whereby said modulated pulses appear with different delays at the different outputs of said delay means, and pulse distribution means connected to apply pulses appearing at the outputs of said delay means to said transmitting circuit in a predetermined repetitive sequence whereby each modulated pulse is transmitted only once, and said means applying said received pulses to said output circuit comprises means inhibiting application of said received pulses to said output circuit that do not occur in said predetermined repetitive sequence.

2. In a pulse code communication system of the type in which a transmitter includes a source of information signals, a source of continuously occurring pulses, means for modulating said pulses with said information signals, a transmitting circuit for transmitting pulses, and means applying said modulated pulses to said transmitting circuit, and said system further includes a receiver for receiving said transmitted pulses, an output circuit, and means applying said received pulses to said output circuit; the improvement wherein said means for applying said modulated pulses to said transmitting circuit comprises delay means having a plurality of outputs whereby said modulated pulses appear with different delays at the different outputs of said delay means, a plurality of gate circuits, means connecting the outputs of said gate circuits in common to said transmitting circuit, means for opening said gate circuits in a predetermined repetitive sequence whereby a separate gate is opened for each modulated pulse, and means connecting the outputs of said delay means to said gate means in a predetermined order, whereby the modulated pulses transmitted by said transmitter occur in pulse groups of pulses arranged with characteristic delays, and wherein said means applying said received pulses to said output circuit comprises means inhibiting application of said received pulses to said output circuit that do not have said characteristic delays.

3. The system of claim 2 wherein said means connecting said outputs of said delay means to said gate circuits comprises a separate multiple position selector switch for selectively connecting each gate circuit to the outputs of said delay means.

4. The system of claim 2 wherein said means for opening said gate circuits comprises counter means connected to said source of pulses, said counter means having a plurality of outputs whereby pulses occur sequentially at the outputs of said counter means, and means connecting the outputs of said counter means to separate gate circuits for controlling the conductive condition of the respective gate circuits.

5. The system of claim 2 wherein said source of pulses comprises an adjustable oscillator.

6. The system of claim 2 wherein said receiver comprises local address transmitting means for producing a pulse train of pulses that have said characteristic delays, means for synchronizing said local address transmitting means with received signals, gate means connected to apply received signals to said output circuit, and means connecting the output of said local address transmitting means to said gate means for controlling the conduction of said gate means.

7. The system of claim 6 wherein said means for synchronizing said local address transmitting means comprises integrating means, and means for applying the output of said gate means to said local address transmitting means by way of said integrating means.

8. The system of claim 7 comprising peak detector means, means connecting the input of said detector means to the output of said gate means, threshold means connected to the output of said detector means, multivibrator means connected to the output of said threshold means, and means applying the output of said multivibrator means to said means for synchronizing for disturbing the synchronization of said local address transmitting means when received pulses do not have said characteristic delays.

9. The system of claim 8 comprising second gate means connected to apply the output of said first mentioned gate means to said output circuit, and means applying the output of said multivibrator means to said second gate means for blocking said second gate means when received pulses do not have said characteristic delays.

10. The system of claim 6 in which said modulating means is a pulse position modulator, comprising pulse position demodulator means connected to the output of said gate means, and means connecting the output of said local address transmitting means to said demodulator means, and means connecting the output of said demodulator means to said output circuit, and said synchronizing means comprises integrating means for connecting the output of said demodulator means to said local address transmitting means.

11. The system of claim 2 in which said modulating means comprises pulse position modulating means, and the delays of pulses produced by said modulating means is substantially less than the delays of pulses introduced by said delay means.

References Cited

UNITED STATES PATENTS

| | | | |
|---|---|---|---|
| 2,516,888 | 8/1950 | Levy | 325—39 X |
| 3,176,225 | 3/1965 | Ransom et al. | 325—38 |
| 3,197,563 | 7/1965 | Hamsher et al. | |

RALPH D. BLAKESLEE, *Primary Examiner.*

U.S. Cl. X.R.

325—39, 55, 143; 332—9; 340—206